(12) United States Patent
Yokotsuka et al.

(10) Patent No.: US 11,041,870 B2
(45) Date of Patent: Jun. 22, 2021

(54) AUTOMATIC ANALYSIS DEVICE

(71) Applicant: Hitachi High-Tech Corporation, Tokyo (JP)

(72) Inventors: Satoshi Yokotsuka, Tokyo (JP); Toshiharu Suzuki, Tokyo (JP); Rira Okashita, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 235 days.

(21) Appl. No.: 15/753,856

(22) PCT Filed: Jul. 1, 2016

(86) PCT No.: PCT/JP2016/069636
§ 371 (c)(1),
(2) Date: Feb. 20, 2018

(87) PCT Pub. No.: WO2017/033576
PCT Pub. Date: Mar. 2, 2017

(65) Prior Publication Data
US 2019/0011469 A1 Jan. 10, 2019

(30) Foreign Application Priority Data
Aug. 27, 2015 (JP) .............................. JP2015-168056

(51) Int. Cl.
G01N 35/02 (2006.01)
G01N 35/10 (2006.01)
(Continued)

(52) U.S. Cl.
CPC ..... *G01N 35/025* (2013.01); *G01N 35/00732* (2013.01); *G01N 35/04* (2013.01);
(Continued)

(58) Field of Classification Search
CPC ................ G01N 35/025; G01N 35/04; G01N 35/00732; G01N 35/1002; G01N 1/10;
(Continued)

(56) References Cited

U.S. PATENT DOCUMENTS 9,432,412 B2 * 8/2016 Chaturvedi ............. H04L 45/00
2009/0269242 A1 * 10/2009 Nozawa ............... G01N 21/274
422/68.1
(Continued)

FOREIGN PATENT DOCUMENTS

EP 2 796 882 A1 10/2014
JP 2008-170191 A 7/2008
(Continued)

OTHER PUBLICATIONS

International Preliminary Report on Patentability (PCT/IB/338 & PCT/IB/373) issued in PCT Application No. PCT/JP2016/069636 dated Mar. 8, 2018, including English translation of document C2 (Japanese-language Written Opinion (PCT/ISA/237)) previously filed on Feb. 20, 2018 (eight pages).
(Continued)

*Primary Examiner* — Kathryn Wright
*Assistant Examiner* — Curtis A Thompson
(74) *Attorney, Agent, or Firm* — Crowell & Moring LLP

(57) ABSTRACT

An automated analysis device includes a reagent disc on which a plurality of reagent containers are loaded; a reagent loader that loads a reagent from the outside onto the reagent disc and carries a reagent to the outside; a display unit that displays the reagents in the plurality of reagent containers, so as to be paired with corresponding analysis items for which the reagents are used; and a control unit that causes the reagent loader to simultaneously carry, to the outside of the reagent disc, a reagent which is selected, on the display unit, by an operation device used for an operation input from
(Continued)

an operator instructing the reagent loader to take out the reagent and simultaneously carry a reagent which is to be used for a different analysis item to be performed simultaneously with the analysis item for the selected reagent.

5 Claims, 11 Drawing Sheets

(51) Int. Cl.
*G01N 35/00* (2006.01)
*G01N 35/04* (2006.01)
*B01J 19/00* (2006.01)
B01L 3/00 (2006.01)
G01N 1/10 (2006.01)

(52) U.S. Cl.
CPC ............ *G01N 35/1002* (2013.01); *B01J 19/00* (2013.01); *B01L 3/00* (2013.01); *G01N 1/10* (2013.01); *G01N 35/00* (2013.01); *G01N 35/00663* (2013.01); *G01N 35/02* (2013.01); *G01N 2035/0091* (2013.01); *G01N 2035/00673* (2013.01); *G01N 2035/00752* (2013.01); *G01N 2035/00792* (2013.01); *G01N 2035/00811* (2013.01); *G01N 2035/0443* (2013.01); *G01N 2035/0444* (2013.01); *G01N 2035/0465* (2013.01); *G01N 2035/0498* (2013.01)

(58) Field of Classification Search
CPC .................. G01N 35/02; G01N 35/00; G01N 2035/00673; G01N 35/00663; G01N 2035/00811; G01N 2035/0498; G01N 2035/0444; G01N 2035/00792; G01N 2035/00752; G01N 2035/0465; G01N 2035/0443; G01N 2035/0091; B01J 19/00; B01L 3/00
See application file for complete search history.

(56) References Cited

U.S. PATENT DOCUMENTS

| 2010/0114501 | A1 | 5/2010 | Kondou et al. |
| 2012/0301359 | A1* | 11/2012 | Kraemer ................ G01N 35/04 422/64 |
| 2014/0322080 | A1 | 10/2014 | Sarwar et al. |
| 2015/0044096 | A1 | 2/2015 | Nakasawa et al. |

FOREIGN PATENT DOCUMENTS

| JP | 2010-281845 A | 12/2010 | |
| JP | 2012-8053 A | 1/2012 | |
| JP | 2013-500489 A | 1/2013 | |
| JP | 2013-217741 A | 10/2013 | |
| JP | 2013253813 * | 12/2013 | ............ G01N 35/00 |
| WO | WO 2013/094485 A1 | 6/2013 | |

OTHER PUBLICATIONS

International Search Report (PCT/ISA/210) issued in PCT Application No. PCT/JP2016/069636 dated Sep. 13, 2016 with English translation (five pages).
Japanese-language Written Opinion (PCT/ISA/237) issued in PCT Application No. PCT/JP2016/069636 dated Sep. 13, 2016 (four pages).
Extended European Search Report issued in counterpart European Application No. 16838923.7 dated Mar. 20, 2019 (13 pages).

* cited by examiner

AUTOMATIC ANALYSIS DEVICE

TECHNICAL FIELD

The present invention relates to an automatic analysis device for carrying out the qualitative/quantitative analysis of a biological sample such as blood and urine.

BACKGROUND ART

The automatic analysis device for the qualitative/quantitative analysis of a specific component contained in the biological sample such as blood and urine (hereinafter referred to as a specimen) is configured to preliminarily accommodate a plurality of reagents used for the specimen analysis, and switch the reagent in accordance with the analysis item.

Meanwhile, the number of the reagents loadable to the automatic analysis device is limited. Generally, some of the loaded reagents, which are not expected to be used for the moment will be taken out from the device, and stored in the separately prepared cooling box so that those stored therein can be timely loaded on the automatic analysis device again in the case of use.

For example, Patent Literature 1 (Japanese Unexamined Patent Application Publication No. 2010-281845) discloses handling of the above-described reagents as described above. Specifically, there are provided a reagent holder capable of holding the reagent kit, to which the identification information including the measurement item requiring the use of the reagent kit is added, and the expiration date of the reagent kit, and a display unit. The identification information is obtained from the reagent kit held with the reagent holder, and the effective date of the reagent kit after opening is set so that the expiry date contained in the identification information or the set effective date after opening the reagent kit, whichever earlier is displayed on the display unit together with the measurement item contained in the identification information.

CITATION LIST

Patent Literature

Patent Literature 1: Japanese Unexamined Patent Application Publication No. 2010-281845

SUMMARY OF INVENTION

Technical Problem

A plurality of analysis items may be combined (set item) to be simultaneously analyzed so as to derive one analysis result from those of the combined analysis items. Accordingly, the set item for analysis may be automatically or manually requested to the automatic analysis device.

The automatic analysis device cannot start the measurement unless the reagents and analysis parameters required for measurement of the analysis item are prepared even if the request is made. When taking out or loading the reagent, there may be the case where some of the combined reagents used for the set item are unintentionally carried away, or such error as forgetful loading and mix-up loading of some of reagents of the reagent set occurs. In the above-described circumstances, the measurement cannot be started. In such a case, all the reagents constituting the reagent set have to be for registration again, and the same request has to be made.

In view of the above-described circumstances, it is an object of the present invention to provide an automatic analysis device capable of suppressing such errors as mix-up loading and forgetful loading of the reagent upon taking out or loading of the reagent.

Solution to Problem

In order to achieve the object, the present invention includes a reagent disc on which a plurality of reagent containers are loaded, having the reagent disc for holding a reagent used for an analysis of a specimen, an incubator having a plurality of reaction vessels arranged allowing the specimen and the reagent to be reacted, a sample dispensation mechanism for dispensing the specimen into the reaction vessel arranged in the incubator, a reagent dispensation mechanism for dispensing the reagent held in the reagent container loaded in the reagent disc into the reaction vessel loaded in the incubator, a reagent loader for loading the reagent from the outside into the reagent disc, and unloading the reagent to the outside, and a display unit for displaying the reagents of the plurality of reagent containers arranged in the reagent disc and analysis items to be analyzed using the reagents, the reagent and the analysis item forming a pair, and a control unit that allows the reagent loader to perform simultaneous unloading of the reagent that is selected with the display unit through an operation device used by an operator for input operations, and designated for unloading by the reagent loader, and the reagent used for another analysis item to be analyzed simultaneously with the analysis item to be analyzed using the selected reagent to the outside of the reagent disc.

Advantageous Effects of Invention

The present invention is capable of suppressing such error as mix-up loading and forgetful loading of the reagent upon taking out or loading of the reagent.

DESCRIPTION OF EMBODIMENTS

Figure 1:
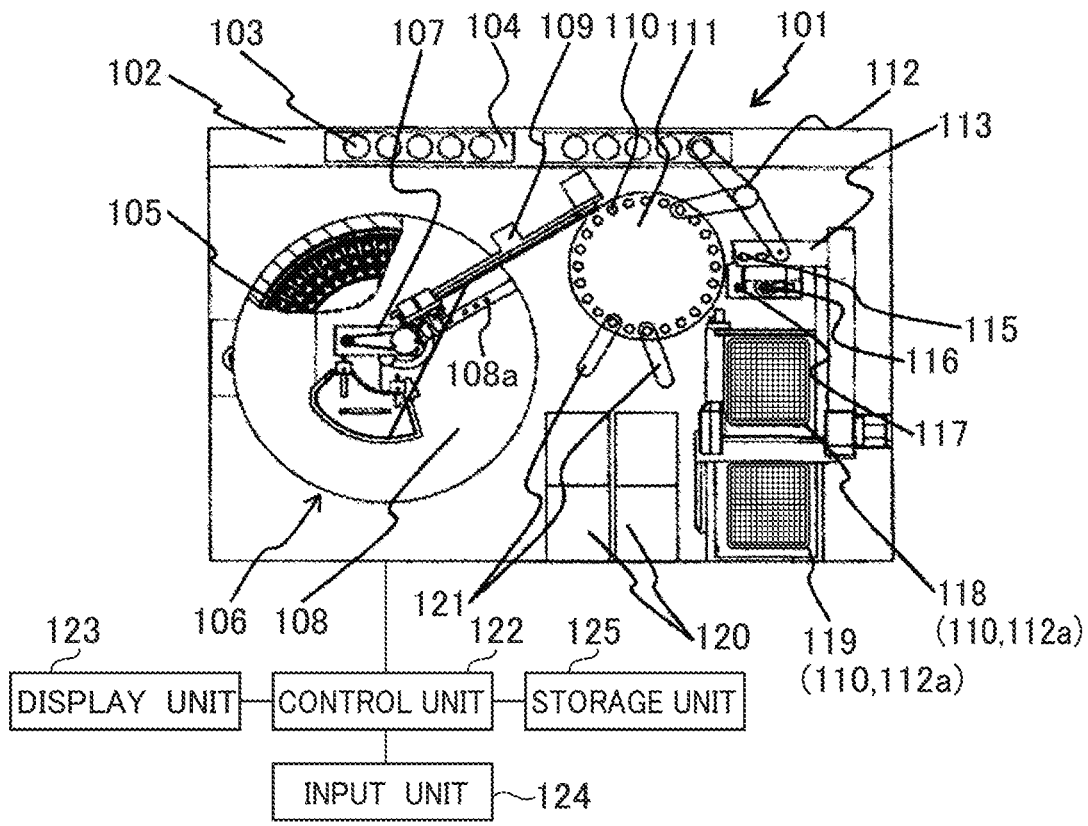
FIG. 1 is a view schematically showing an overall structure of an automatic analysis device according to a first embodiment.

Embodiments according to the present invention will be described referring to the drawings.

First Embodiment

A first embodiment of the present invention will be described in detail referring to FIGS. 1 to 14.

FIG. 1 is a view schematically showing an overall structure of an automatic analysis device according to the embodiment.

Referring to FIG. 1, an automatic analysis device 101 includes a rack carrier line 102, a sample container rack 104, a reagent disc 106, a reagent loader 107, an incubator disc 111, a sample dispensation nozzle 112, a reagent dispensation nozzle 109, a reaction vessel/sample dispensation chip storage unit 118, a reaction vessel/sample dispensation chip storage unit 119 for exchange/supplementary purpose, a reaction vessel stirring mechanism 116, a disposal hole 115, a carrier mechanism 113, a nozzle 121, a detection unit 120, a control unit 122, a display unit 123, an input unit 124, and a storage unit 125.

The rack carrier line 102 carries the sample container rack 104 which holds one or more sample containers 103 (five containers in this embodiment) each storing the biological sample such as blood and urine (hereinafter referred to as a specimen).

The reagent disc 106 is covered with a reagent disc cover 108 which separates the inside of the reagent disc for storing reagent containers 105 which contain various reagents respectively used for the specimen analysis from the outside. The reagent disc 106 is not limited to the disc type having the reagent containers 105 circumferentially arranged, and may be configured to be of serial type having the reagent containers 105 arranged in at least one row.

The reagent loader 107 is disposed on an inner periphery of the reagent disc 106 for executing the process of carrying the reagent container 105 from the outside to the inside of the reagent disc 106 for loading, and further executing the process of carrying the reagent container 105 from the inside to the outside of the reagent disc 106.

The incubator disc 111 includes a plurality of reaction vessels 110 for mixing the specimen and the reagent for reaction. The sample dispensation nozzle 112 may be rotatably and vertically driven. The nozzle 112 sucks and discharges the specimen stored in the sample container 103 so that the specimen is dispensed from the sample container 103 to the reaction vessel 110 of the incubator disc 111. The reagent dispensation nozzle 109 may be rotatably and vertically driven so that the reagent is dispensed from the reagent container 105 to the reaction vessel 110 of the incubator disc 111 via a reagent disc cover opening 108a formed in the reagent disc cover 108. The reaction vessel stirring mechanism 116 stirs the mixture (reaction liquid) of the specimen and the reagent stored in the reaction vessel 110.

The reaction vessel/sample dispensation chip storage unit 118 stores a plurality of unused reaction vessels 110 and sample dispensation chips 112a. The reaction vessel/sample dispensation chip storage unit 119 stores unused reaction vessels 110 and the sample dispensation chips 112a, both of which will be used for exchange or supplementary purpose for the reaction vessel/sample dispensation chip storage unit 118.

The carrier mechanism 113 is disposed movably directions of X-axis, Y-axis, and Z-axis so as to carry the sample dispensation chip 112a and the reaction vessel 110 while being gripped. The used reaction vessel 110 of the incubator disc 111 is carried to the disposal hole 115 by the carrier mechanism 113 for abandonment. Then unused reaction vessel 110 stored in the reaction vessel/sample dispensation chip storage unit 118 is carried to the incubator disc 111 for loading. The unused sample dispensation chip 112a is carried to a chip loading position 117 so as to be loaded on the sample dispensation nozzle 112. The used sample dispensation chip 112a is directly carried to the disposal hole 115 for abandonment.

The nozzle 121 is allowed to be rotatably and vertically driven so as to suck the reaction liquid mixed in the reaction vessel 110 of the incubator disc 111, and sends the reaction liquid to the detection unit 120. The detection unit 120 executes the process of detecting the specific component of the reaction liquid which has been sucked and sent by the nozzle 121.

The control unit 122 configured to control overall operation of the automatic analysis device 101 includes the display unit 123, the input unit 124, and the storage unit 125.

The input unit 124 as a mouse or a keyboard, for example, allows the operator to input various kinds of information, or operation instructions.

The display unit 123 displays various setting screens, the operation screens, various kinds of information, analysis results and the like, and may be operated as a graphic user interface (GUI) through the input unit 124.

The storage unit 125 stores various settings, reagent information, analysis results and the like. For example, the reagent information represents the reagent stored in the reagent container 105.

Figure 2:
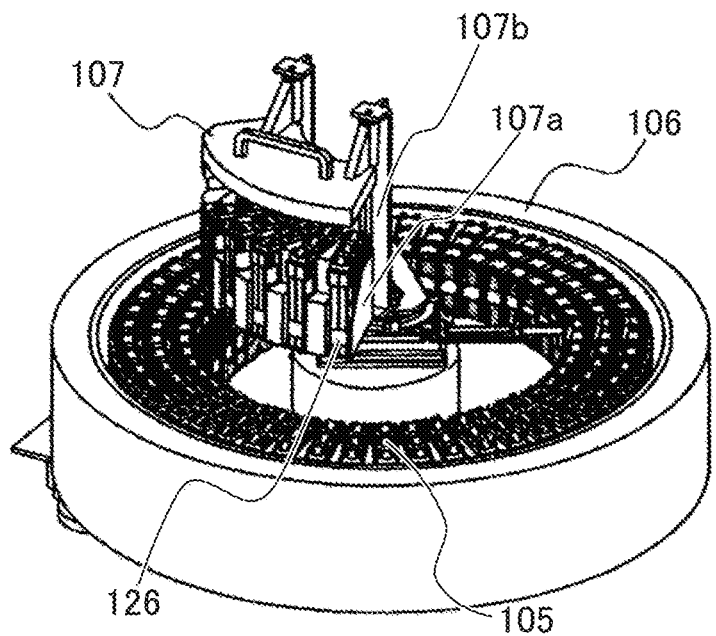
FIG. 2 is a view showing a reagent disc extracted together with a reagent loader.
Figure 3:
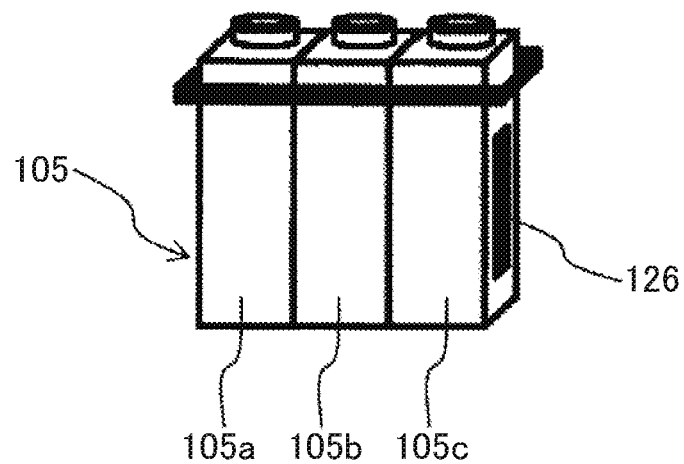
FIG. 3 is a detailed explanatory view of a reagent container.

FIG. 2 is a view showing the reagent disc extracted together with the reagent loader. FIG. 3 is a view explaining the reagent container in detail. Referring to FIG. 2, the reagent disc cover 108 is omitted for explanatory purpose.

As FIG. 3 shows, the reagent container 105 includes a plurality of reagent vessels (three vessels in the embodiment) 105a to 105c each containing the reagent used for the specimen analysis. The reagent container 105 may be classified to the one configured to store a set of analysis reagents for a certain analysis item in the reagent vessels 105a to 105c, store the diluted solution in the reagent vessels 105a to 105c, or store the reagents for confirming the device status in the reagent vessels 105a to 105c. The reagent container 105 includes an individual identification mark 126. The individual identification mark 126 may be a barcode label, an RFID label and the like. The identification information recorded in the individual identification mark 126 includes a reagent identification number (reagent identification code) for identifying the reagent stored in the reagent container 105, a description of the corresponding analysis item, a lot number, a sequence number, and the like.

Referring to FIG. 2, the reagent disc 106 including the plurality of reagent containers 105 has the reagent loader 107 disposed inside (around the center of the reagent disc 106). The reagent loader 107 includes a plurality of slots 107a (for example, five slots in the embodiment) through which the reagent containers 105 are inserted. The reagent loader 107 moves in the vertical direction so as to load and unload the reagent container 105 between the outside and the inside of the reagent disc, while being separated by the reagent disc cover 108. The reagent disc 106 includes a reader 107b configured to read the individual identification mark 126 attached to the reagent container 105, and send the read information to the control unit 122.

Figure 4:
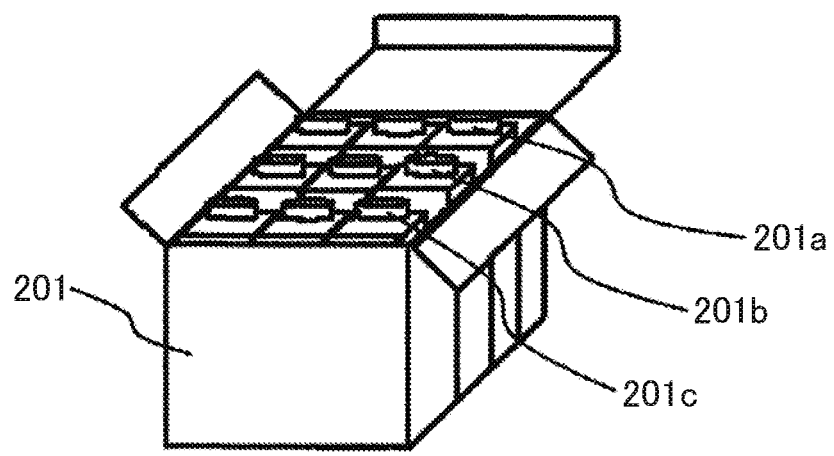
FIG. 4 is a view showing a configuration of a reagent set.

FIG. 4 is a view showing a structure of a reagent set.

Referring to FIG. 4, a reagent set 201 is formed as a combination of reagents used for a plurality of combined analysis items (set item) to be simultaneously analyzed. Based on the analysis results, the single analysis result is obtained. The reagent set includes a plurality of reagent containers (for example, three containers in the embodiment) 201a to 201c. In this case, the reagent container 201a is correlated with the other reagent containers 201b, 201c used for the analysis item to be analyzed simultaneously with the analysis item using the reagent container 201a. The thus correlated containers are stored.

Figure 5:
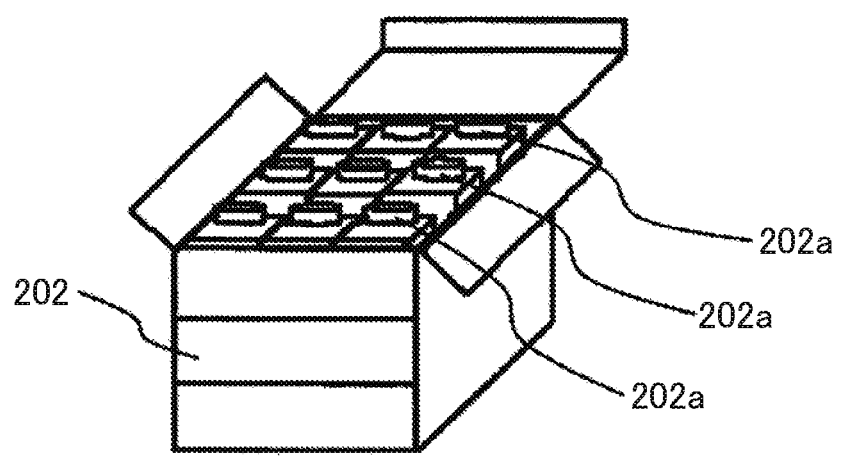
FIG. 5 is a view showing another configuration of the reagent set.

As FIG. 5 shows, a reagent set 202 includes reagent containers 202a for the analysis item. That is, the plurality of reagent containers 202a constitute the single reagent set 202.

Figure 6:
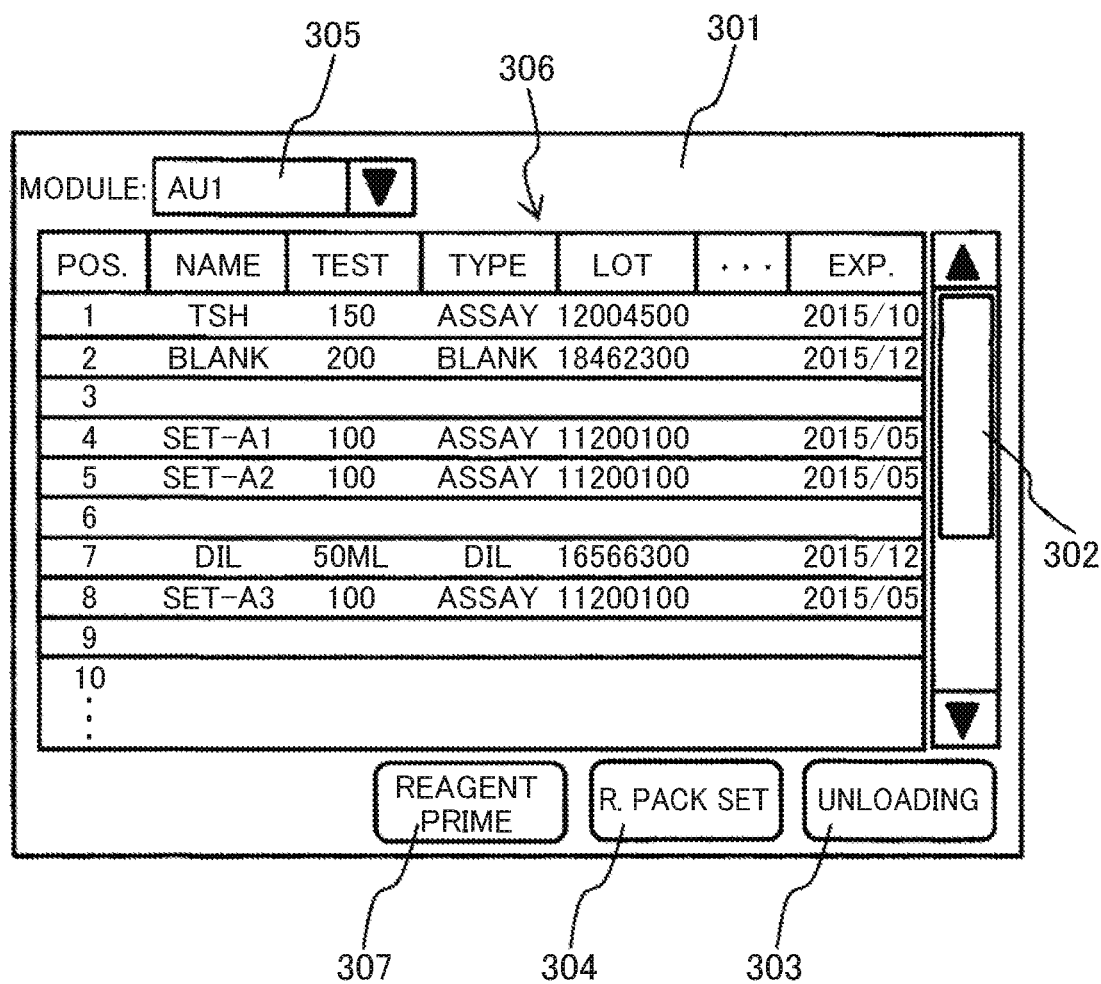
FIG. 6 is a view showing a reagent information setting screen as one of operation screens displayed on a display unit.

FIG. 6 is a view showing a reagent information setting screen as one of operation screens displayed on the display unit.

As FIG. 6 shows, a reagent information setting screen 301 includes a module selection section 305 for selection of a module name assigned by the automatic analysis device 101, a reagent information display section 306 for displaying an information list of all the reagent containers 105 on the reagent disc 106 of the selected module in the positional order, a scroll bar 302 for slidably displaying the reagent information which cannot be displayed on the reagent information display section 306 in one time, a reagent preparation button 307, a reagent set button 304 for displaying the reagent set information screens 401A, 401B, 401C (see FIGS. 7 to 9 to be described later), and a reagent unloading button 303 for taking out of the reagent container 105 using the reagent loader 107.

Figure 7:
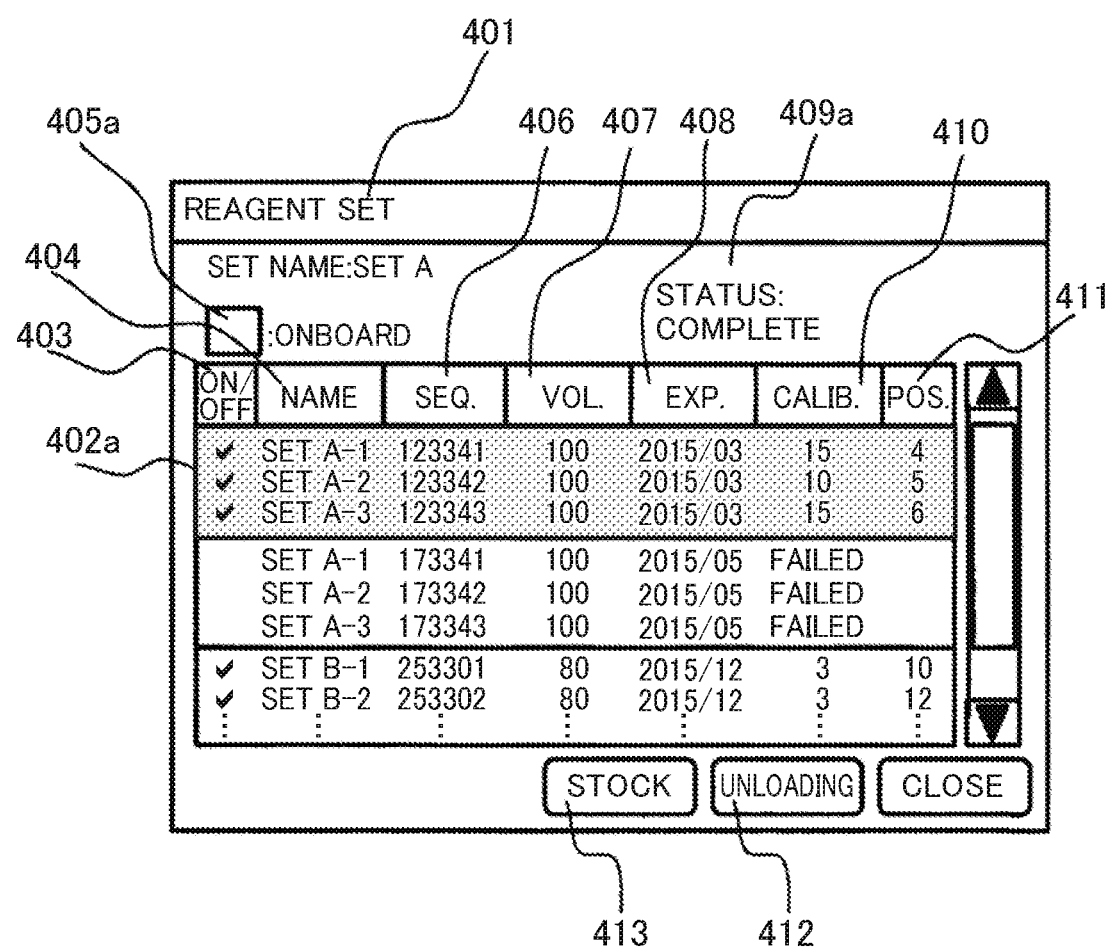
FIG. 7 is a view showing a reagent set information screen in the case where a device loading/unloading switch button is unchecked.
Figure 8:
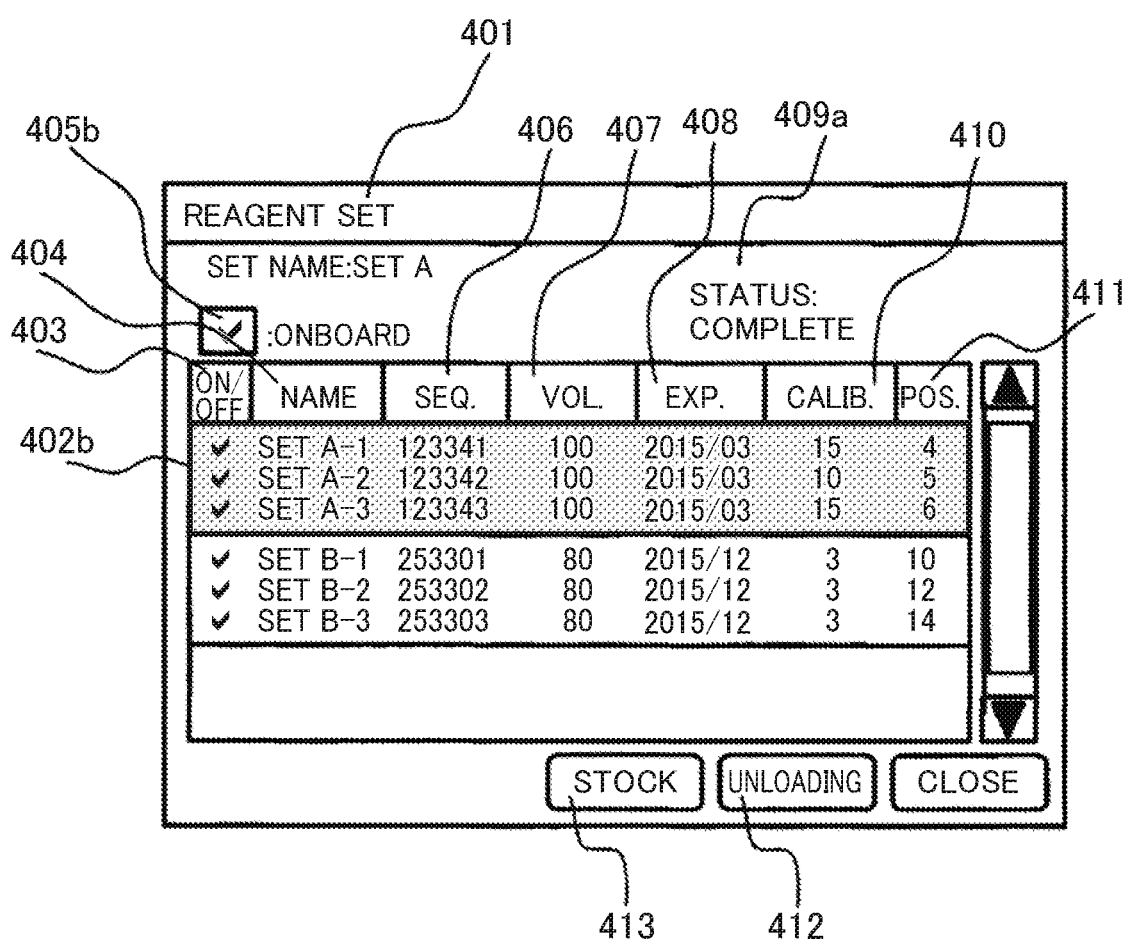
FIG. 8 is a view showing a reagent set information screen in the case where the device loading/unloading switch button is checked.
Figure 9:
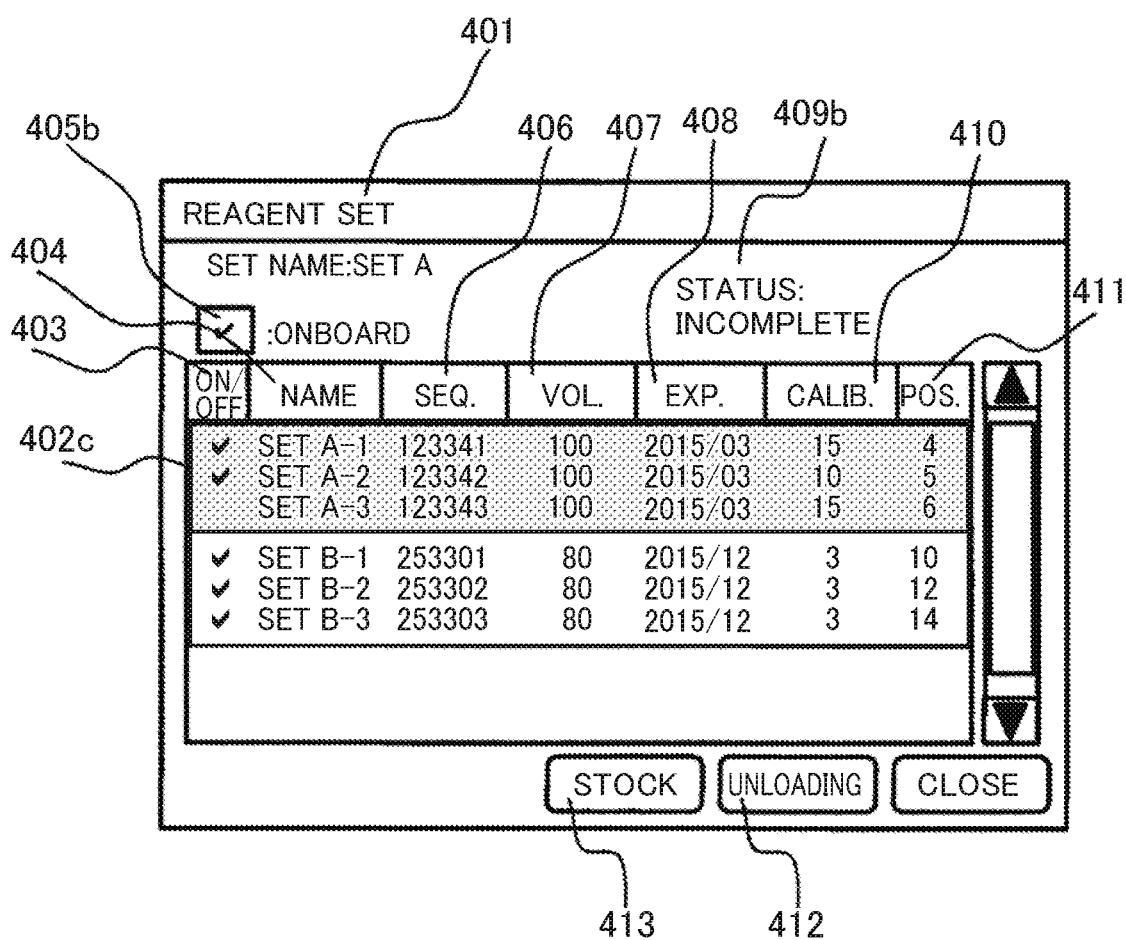
FIG. 9 is a view showing a reagent set information screen in the case where the reagent is not loaded in the state as indicated by FIG. 8.

FIGS. 7 to 9 are views showing the reagent set information screens. FIG. 7 shows the screen indicating that the device loading/unloading switch button is unchecked. FIG. 8 shows the screen indicating that the device loading/unloading switch button is checked. FIG. 9 shows the screen indicating that the reagent has not been loaded in the state as indicated by FIG. 8.

As FIG. 7 shows, the reagent set information screen 401A displays the information of the reagent set 201 indicating the residual reagent in the reagent set information list 402a from data stored in the storage unit 125 in accordance with the checked state of the device loading/unloading switch button 405a.

The reagent set information screen 401A displays the reagent sets 201 in the reagent set information list 402a. The reagent set information list 402a includes a device loading/unloading section 403, a reagent name 404, reagent identification information 406, a reagent residual volume 407, a reagent effective date 408, a calibration result/calibration effective date 410, and a position 411 of the reagent on the device.

Assuming that the information of the device loading/unloading section 403 indicates that all the reagents contained in the respective reagent containers 201a to 201c constituting the reagent set 201 as displayed in the reagent set information list 402a have been loaded on the device, "Complete" is displayed at a section of a reagent status 409a.

The reagent set information list 402a displays a plurality of reagent sets 201 with the same analysis item. In reference to such information as the reagent residual volume 407, the reagent effective date 408, and the calibration result/calibration effective date 410, the user is allowed to use the reagent selected between the one already loaded on the device as indicated by the checked device loading/unloading section 403 and the displayed one stored in the cooling box based on the information of the storage unit 125.

As FIG. 8 shows, the reagent set information screen 401B represents the state where the device loading/unloading switch button 405a has been depressed (referred to as device loading/unloading switch button 405b). The information of the reagent set 201 having at least one of the reagent containers 201a to 201c loaded on the device is displayed in a reagent set information list 402b.

Upon depression of the reagent unloading button 303 on the reagent information setting screen 301 for unloading the reagent container 105 from the reagent disc 106, the selected reagent container 105 only becomes the one to be unloaded. Although a plurality of reagent containers may be selected, they have to be searched from the reagent containers 201a to 201c that constitute the reagent set 201 on the screen. In the case where the list of the reagent containers does not fit in one screen owing to increase in the reagents to be loaded on the device, the scroll bar 302 has to be operated for scrolling. This may often cause selection error. On the contrary, the reagent set information screen 401B allows selection and display of the reagent set. The reagent unloading button 412 may be operated to unload the reagent set 201 collectively from the reagent loader 107.

Even if the cooling capability of the reagent disc 106 is improved sufficient to perform cold reserving on the device, the number of the reagent containers 105 which are loadable in the reagent disc 106 is limited because of daily change in the measurement item. There may be the case where the reagent unloading button 412 is depressed to unload the unit of the reagent set 201 from the device for the purpose of saving electric power by turning off the device, and collecting the reagent containers 105 in the cooling box for such circumstances as replacement of the reagent containers, and the dormant state of the device during long vacation.

As FIG. 9 shows, the reagent set information screen 401O displays the reagent sets 201 in a reagent set information list 402c. If the reagent set 201 having the reagent failed to be loaded in the device, the information at the device loading/unloading section 403 becomes blank.

The blank display part of the information at the device loading/unloading section 403 in the reagent set information list 402c indicates that any one of the reagent containers 201a to 201c constituting the reagent set 201 is not loaded on the device. Therefore, "Incomplete" is displayed in the reagent status 409b.

The new reagent is supplied when the reagent containers 201a to 201c are provided to constitute the reagent set 201. Normally, therefore, it is unlikely that only one of those reagent containers of the reagent set 201 is not loaded if a plurality of reagent sets 201 exist in the cooling box, there may cause inappropriate combination owing to mix-up reagent loading. In such a case, the reagent status 409b on the reagent set information screen 401 is confirmed. The status "Incomplete" represents that the reagent containers 201a to 201c indicated by the blank display at the device loading/unloading section 403 have not been loaded on the device through confirmation of the reagent set information list 402c.

The above description has been made as an example that the reagent is supplied to hospital or inspection facility of small scale. In the case of hospital or inspection facility of large scale, for example, unlike the use of the reagent set 201, the reagent is supplied by the use of the reagent set 202 including the same containers 202a for coping with a large volume of the reagent consumed for a large number of analyses and analysis items. In such a case, the mix-up reagent loading is likely to occur, and the inappropriate reagent may be loaded on the device. Then the reagent that has been loaded on the device s displayed in the reagent set information list 402a.

Figure 10:
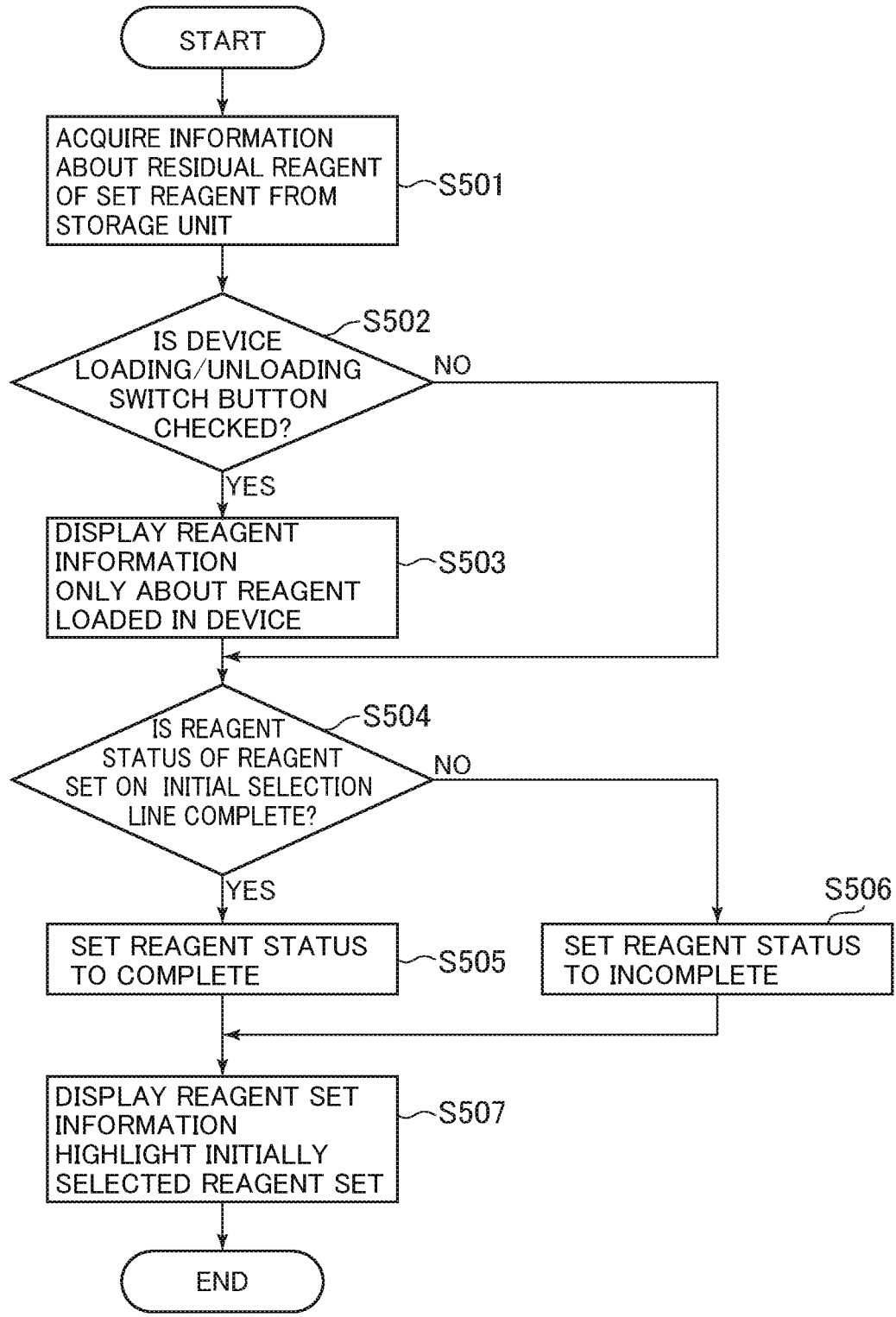
FIG. 10 is a flowchart representing process steps to be executed upon depression of a reagent set button.

FIG. 10 is a flowchart representing process steps executed upon depression of the reagent set button.

Referring to FIG. 10, upon depression of the reagent set button 304, the control unit 122 acquires information with respect to the reagent set with residual reagent from the storage unit 125 as the displayed information that constitutes the reagent set information screen (step S501). Then it is judged whether or not the device loading/unloading switch button on the reagent set information screen has been checked (step S502). If the judgement result is YES, the information with respect only to the reagent that has been loaded in the reagent disc 106 is displayed (on the reagent set information screen 401B) (step S503). The process then proceeds to step S504. In step S501, if the device loading/unloading switch button on the reagent set information screen has been unchecked, the reagent information about all the registered reagents (reagent set information screen 401A) is displayed. The process then proceeds to step S504.

In step S504, it is judged with respect to completeness of the reagent status of the reagent set on the initial selection line displayed in the reagent set, information list 402a (step S504). If the judgement result is YES, the reagent status is set to Complete as indicated by the reagent status 409a (step S505). If the judgement result is NO, the reagent status is set to Incomplete as indicated by the reagent status 409b (step S506). After execution of step S505 or S506, the reagent set information derived from correlation between the reagent for the analysis item, and the other reagent used for the analysis item to be simultaneously executed is displayed in the reagent set information lists 402a to 402c, the device loading/unloading switch buttons 405a, 405b, and the reagent statuses 409a, 409b. The currently selected reagent set on the initial selection line is highlighted on the display (step S507).

Figure 11:
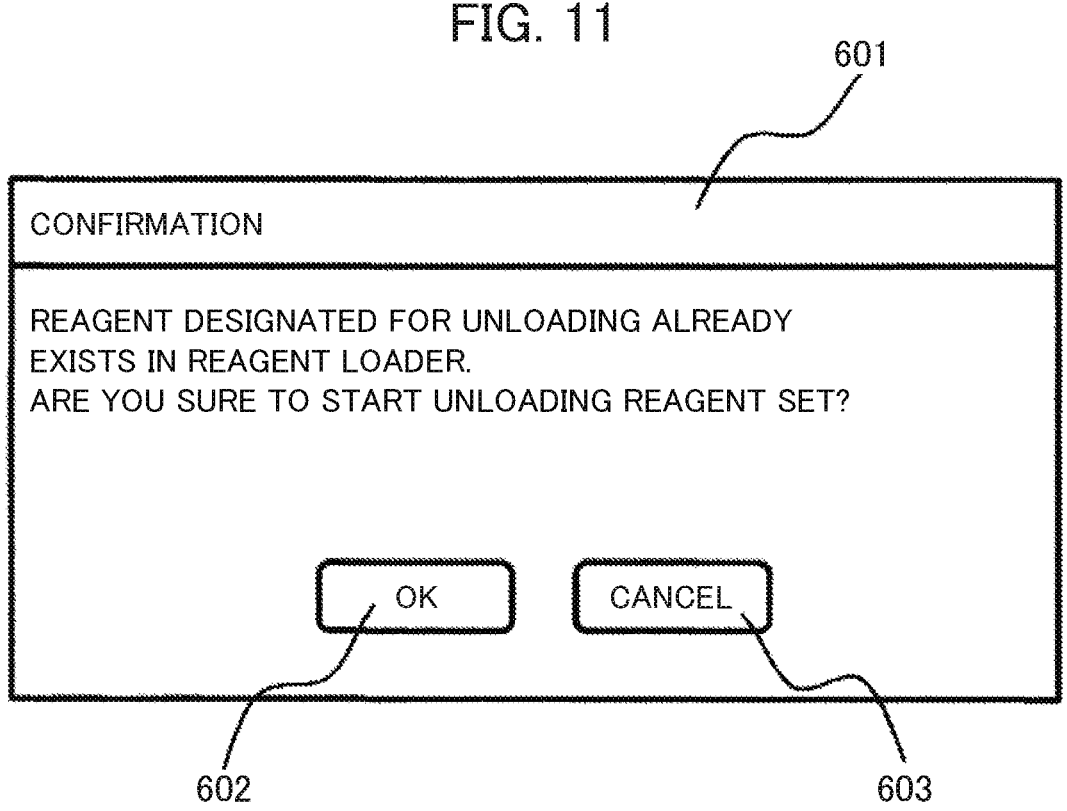
FIG. 11 is a view showing a confirmation screen.

FIG. 11 is a view showing a confirmation screen.

Referring to FIG. 11, a confirmation screen 601 is displayed when the reagent container 105 to be unloaded has been already loaded in the reagent loader 107 upon depression of the reagent unloading button 412 as shown in FIGS. 7 to 9. The above-described case occurs, for example, when the residual reagent has been used up during the analysis. Upon depression of the reagent unloading button 412, the reagent set 201 selected from the reagent set information list 402a becomes the one to be unloaded with the reagent loader 107.

The confirmation screen 601 on display allows the user to select and depress either an OK button 602 or a Cancel button 603. If the OK button 602 is selected, the reagent container 105 designated to be unloaded with the reagent loader 107 will be unloaded therefrom together with the reagent set 201 selected from the reagent set information list 402a.

If the OK button 602 is depressed, the reagent container 105 designated to be unloaded will be unloaded from the reagent loader 107 together with the reagent containers 105 of the reagent set selected from the reagent set information list 402a. The operator is allowed to handle the reagent container 105 while taking care for storing them in the cooling box.

If the Cancel button 603 is depressed, unloading of the reagent set 201 selected from the reagent set information list 402a is canceled so as to make the reagent container 105 that has been designated to be unloaded by the user ready for unloading. The reagent unloading button 412 is depressed again in the state where the reagent container 105 is not loaded in the reagent loader 107 so as to unload the reagent set 201. It is therefore possible to store the reagent, set 201 as a unit in the cooling box.

Figure 12:
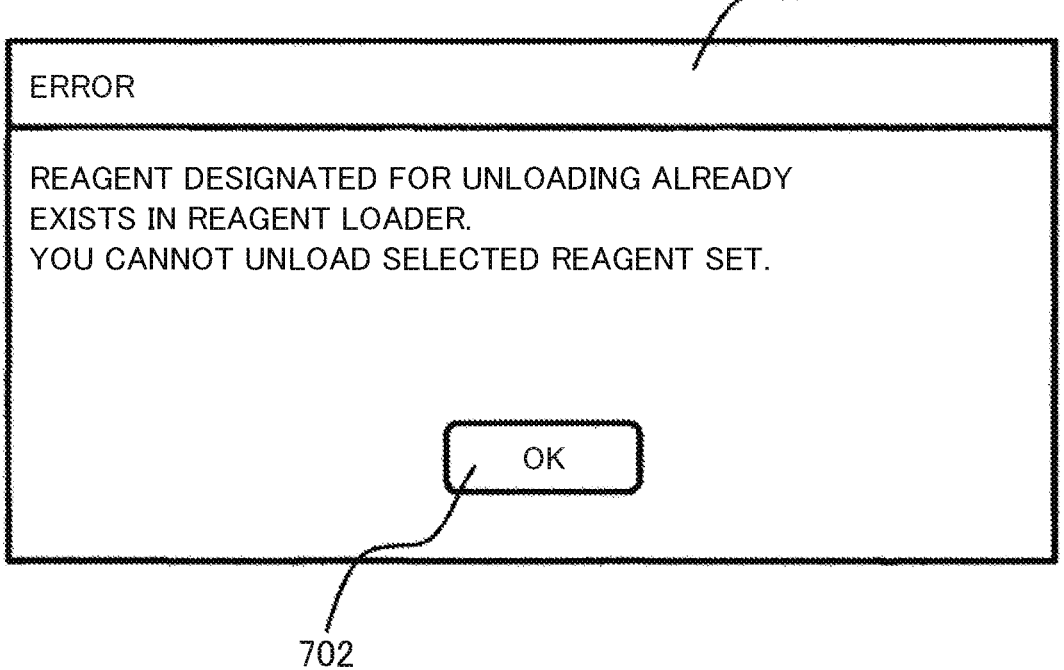
FIG. 12 is a view showing an error screen.

FIG. 12 is a view showing an error screen.

FIG. 12 shows a confirmation screen 701. Assuming that the reagent container 105 has been loaded in the reagent loader 107 designated for unloading the reagent automatically upon depression of the reagent unloading button 412 as shown in FIGS. 7 to 9, if the reagent set selected from the reagent set information list 402a is added to the designated reagent container, the number of the reagent containers that can be handled by the reagent loader 107 will exceed the limit value. Then the confirmation screen will be displayed.

Referring to FIG. 12, an OK button 702 depressed to cancel unloading of the reagent set 201 selected from the reagent set information list 402a so that the reagent container 105 designated by the user for unloading may be taken out. The reagent unloading button 412 is depressed again in the state where the reagent container 105 is not loaded in the reagent loader 107 for unloading the reagent set 201.

Advantageous effects of the thus configured embodiment will be described.

The automatic analysis device is configured to combine a plurality of analysis items to be executed simultaneously (set item) so that the single analysis result may be obtained from those of the analysis items. In this way, the set item may be automatically or manually requested when making a request of the analysis item to the automatic analysis device. However, the reagent and the analysis parameters necessary for measurement of the analysis item have to be prepared for the automatic analysis device to start measurement in response to the request. For example, if some of the combined reagents (reagent set) to be used for the set item are unintentionally taken out from the automatic analysis device upon unloading or loading of the reagent, or some of the reagents constituting the reagent set are left untaken forgetfully or mixed up, the measurement cannot be started. In the above-described case, all the reagents constituting the reagent set have had to be loaded for registration, and the same request has had to be made again.

The embodiment includes a reagent disc on which a plurality of reagent containers are loaded, having the reagent disc for holding a reagent used for an analysis of a specimen, an incubator having a plurality of reaction vessels arranged for allowing the specimen and the reagent to be reacted, a sample dispensation mechanism for dispensing the specimen into the reaction vessel arranged in the incubator, a reagent dispensation mechanism for dispensing the reagent held in the reagent container loaded in the reagent disc into the reaction vessel loaded in the incubator, a reagent loader for loading the reagent from the outside into the reagent disc and unloading the reagent to the outside, and a display unit for displaying the reagents of the plurality of reagent containers arranged in the reagent disc and analysis items to be analyzed using the reagents, making the reagent and the analysis item into a pair. It is further configured to allow the reagent loader to perform simultaneous unloading of the reagent that is selected with the display unit through an operation device used by an operator for input operations, and designated for unloading by the reagent loader, and the reagent used for another analysis item to be analyzed simultaneously with the analysis item to be analyzed using the selected reagent to the outside of the reagent disc. It is therefore possible to reduce such error as mix-up or untaken reagent upon unloading and loading of the reagent.

The device loading/unloading information of the reagent set 201 may be confirmed in reference to the reagent set information list 402a. Therefore the user is allowed to select the reagent set 201 to be loaded on the device from the cooling box 801 based on the number of specimen measurements on the day, the reagent residual volume 407, the reagent effective date 408, the calibration result/calibration effective date 410 based on the confirmation result. In the case of mix-up loading in the reagent sets 201 in the cooling box 801, it is possible to identify, from the reagent set information list 402C and the reagent status 409b, the reagent container either the reagent container 201a, 201b, or 201c, which is not loaded on the device. The unit of reagent set 201 selected from the reagent set information list 402a may be unloaded from the reagent loader 107 through depression of the reagent unloading button 412. The reagent set may be collectively stored in the cooling box 801 without dispersing the reagents of the reagent set.

It is therefore possible to visualize the reagent list having the reagent for the required analysis item correlated with the other reagent for the analysis item to be simultaneously analyzed. It is possible to provide the automatic analysis device that ensures to optimize the reagent to be used, prevent mix-up loading of the reagent, omission of loading on the device, dispersion of the reagent upon storage in the cooling box, and reduce labor of the user.

Modified Example of the First Embodiment

A modified example of the first embodiment will be described referring to FIGS. 13 and 14.

In the modified example, the control unit, the cooling box for the reagent, and a cooling box storage unit are correlated with one another.

Figure 13:
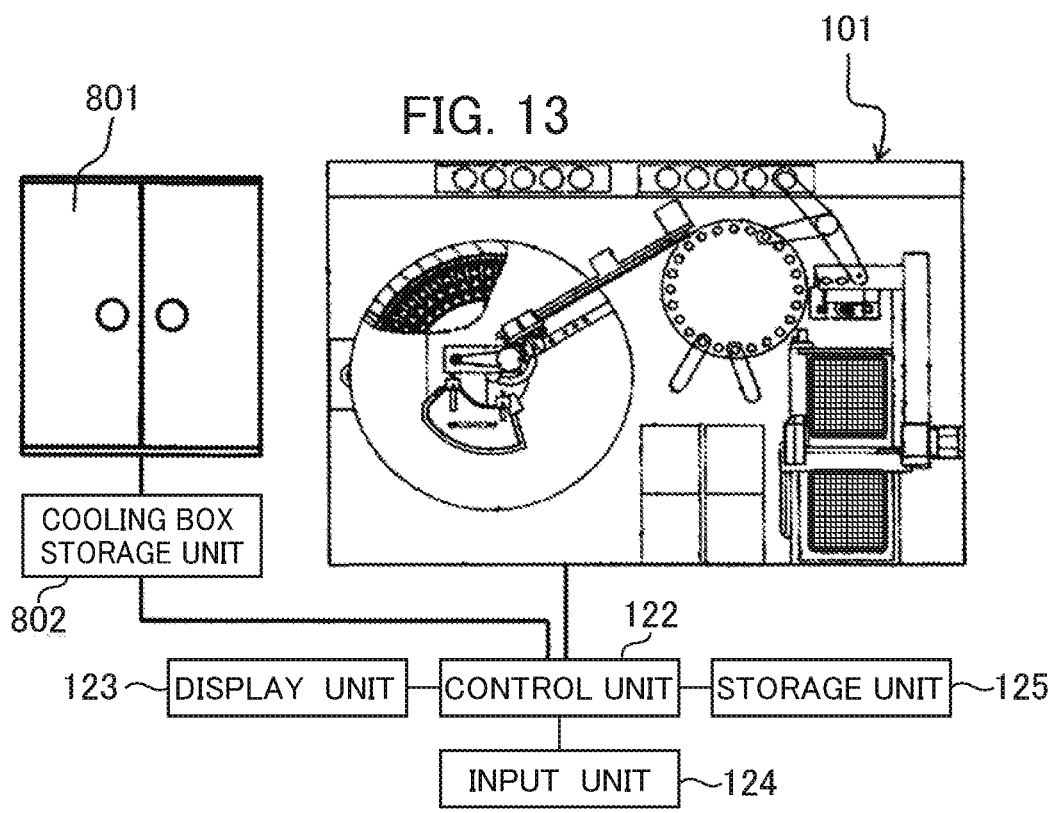
FIG. 13 is a view schematically showing an overall structure of a modified example of the automatic analysis device according to the first embodiment.

FIG. 13 schematically shows an overall structure of the automatic analysis device according to the modified example. Referring to the drawing, the similar members to those of the first embodiment will be designated with the same codes, and explanations thereof, thus will be omitted.

Referring to FIG. 13, the cooling box 801 is a reagent storage. The reagent information concerning the storage box 801 is stored in a cooling box storage unit 802 for the reagent management purpose.

The control unit 122 and the cooling box storage unit 802 may be connected either wiredly or wirelessly. Connection of those units allows confirmation as to the number of the reagents left in the cooling box 801, which have the same lot numbers of the reagent information stored in the storage unit 125 as those of the reagent information stored in the cooling box storage unit 802.

Figure 14:
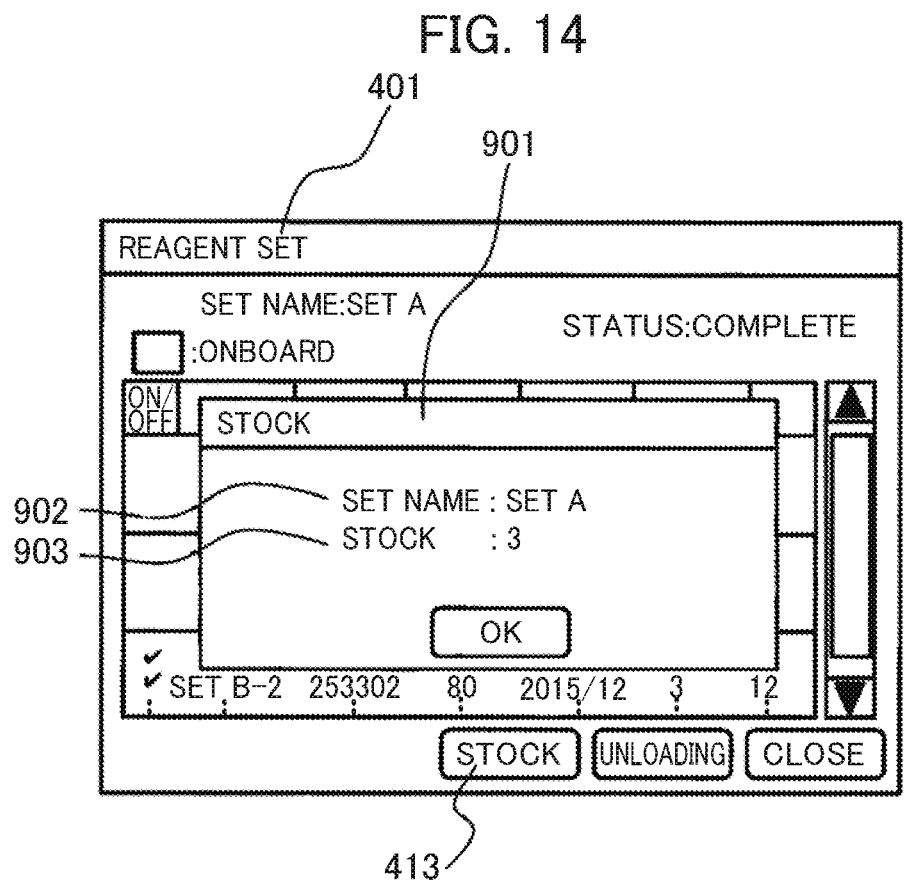
FIG. 14 is a view showing a stock screen displayed together with the reagent set screen.

FIG. 14 is a view showing a stock screen displayed together with the reagent set screen.

As FIG. 14 shows, a stock screen 901 is displayed upon depression of a stock button 413 on the reagent set information screen 401. The stock screen 901 displays the number of the reagent sets which are the same as those selected from the reagent set information list 402a stored in the cooling box 801.

The stock screen 901 displays a reagent set name 902 and a stock amount 903. The stock amount 903 is acquired from the cooling box storage unit 802 so as to be displayed as the number of reagents in the cooling box 801. Referring to an example of FIG. 14, three reagent sets are stored in the cooling box 801.

Any other structures are the same as those described in the first embodiment.

The thus structured modified example provides the similar advantageous effects to those derived from the first embodiment.

Second Embodiment

A second embodiment according to the present invention will be described referring to FIG. 15.

This embodiment relates to the case where the number of the reagent containers loadable in the reagent loader is set to 1.

Figure 15:
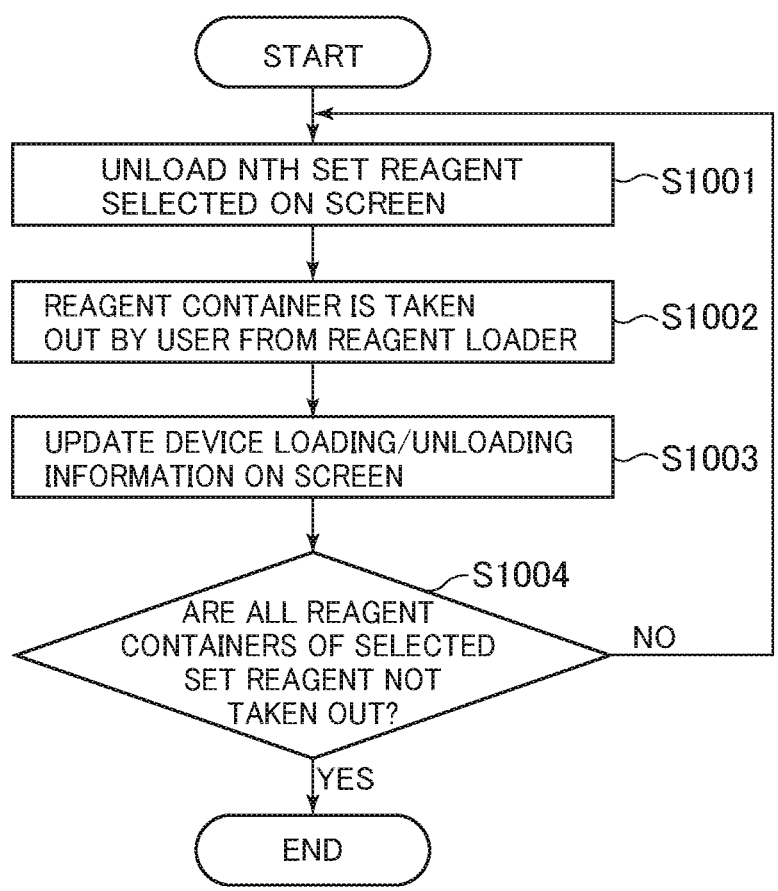
FIG. 15 is a flowchart representing process steps to be executed upon depression of a reagent unloading button according to a second embodiment.

FIG. 15 is a flowchart representing process steps to be executed upon depression of the reagent unloading button according to the embodiment. The similar members to those of the first embodiment will be designated with the same codes, and explanations thereof, thus, will be omitted.

Referring to FIG. 15, upon depression of the reagent unloading button 412 (see FIGS. 7 to 9), the control unit 122 allows the reagent loader 107 to unload the Nth (the first set is unloaded at the first time) reagent set selected in reference to the reagent set information list 402a from the reagent disc 106 (step S1001). The reagent container 105 unloaded in step S1001 is taken out from the reagent loader by the user (step S1002). The information of the device loading/unloading section 403 of the reagent container 105 which has been taken out in step S1002 is updated (step S1003). It is judged as to absence of the reagent container 105 of the selected reagent set (step S1004). If a judgement result is YES, the process ends. If the judgement result in step S1004 is NO, the process returns to step S1001 for taking out the next reagent container 105.

Any other structures are similar to those described in the first embodiment.

The above structured embodiment provides the similar advantageous effects to those derived from the first embodiment.

Third Embodiment

A third embodiment according to the present invention will be described referring to FIG. 16.

This embodiment is configured to allow identification of the reagent set on the reagent information setting screen.

Figure 16:
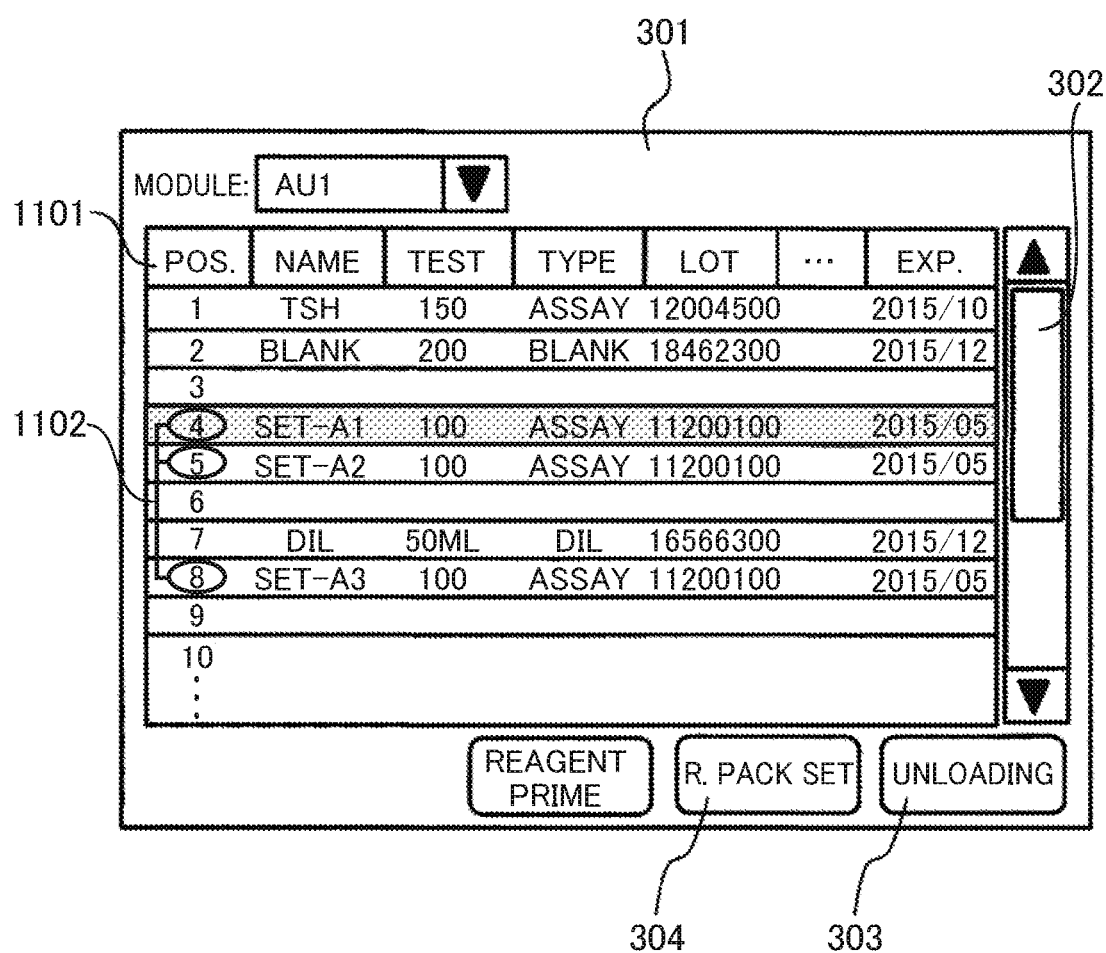
FIG. 16 is a view showing a reagent information setting screen according to a third embodiment.

FIG. 16 is a view showing the reagent information setting screen according to the embodiment. The similar structures to those of the first embodiment will be designated with the same codes, and explanations thereof, thus will be omitted.

As FIG. 16 shows, on a reagent information setting screen 301A, upon selection of the fourth reagent information of a reagent position 1101, a background color of the selected line will vary. On the screen, the fifth and the eighth data of the reagent position 1101 are displayed while being linked with a correlation display line 1102 indicating that those linked reagents and the fourth reagent information of the reagent position 1101 constitute the reagent set.

Any other structures are similar to those described in the first embodiment.

The above-structured embodiment provides the similar advantageous effects to those derived from the first embodiment.

The reagent set 201 may be distinguished in reference to the reagent information setting screen 301. Therefore, it is possible to actualize the automatic analysis device that ensures to reduce labors of the user.

The present invention is not limited to the above-described embodiments, but includes various modifications. For example, the above embodiments have been described in detail for easy understanding of the present invention. Therefore, all the components as described above do not have to be necessarily provided.

LIST OF REFERENCE SIGNS

101: automatic analysis device,
102: rack carrier line,
103: sample container,
104: sample container rack,
105: reagent container,
105a, 105b, 105c: reagent vessel
106: reagent disc,
107: reagent loader,
107a: slot,
107b: reader,
108: reagent disc cover,
108a: reagent disc cover opening,
109: reagent dispensation nozzle,
110: reaction vessel,
111: incubator disc,
112: sample dispensation nozzle,
112a: sample dispensation chip,
113: carrier mechanism,
115: disposal hole,
116: reaction vessel stirring mechanism,
117: chip loading position,
118, 119: reaction vessel/sample dispensation chip storage unit,
120: detection unit,
121: nozzle,
122: control unit,
123: display unit,
124: input unit,
125: storage unit,
126: individual identification mark,
201: reagent set,
201a, 201b, 201c: reagent container,
202: reagent set,
202a: reagent container,
301: reagent information setting screen,
301A: reagent information setting screen,
302: scroll bar,
303: button,
304: reagent set button,
305: module selection unit,
306: reagent information display unit,
307: reagent preparation button,
401: reagent set information screen,
401A, 401B, 401C: reagent set information screen,
402a, 402b, 402c: reagent set information list,
403: device loading/unloading section,
404: reagent name,
405a: device loading/unloading switch button,
405b: device loading/unloading switch button,
406: identification information,
407: residual volume,
408: effective date,
409a, 409b: reagent status,
410: effective date,
411: position,
412: button,
413: stock button,
601: confirmation screen,
602: button,
603: Cancel button,
701: confirmation screen,
702: button,
801: cooling box,
602: cooling box storage unit,
901: stock screen,
902: reagent set name,
1101: reagent position,
1102: display line

The invention claimed is:

1. An automatic analysis device comprising:
a reagent disc on which a plurality of reagent containers are loaded, the plurality of reagent containers holding a plurality of reagents;
at least one reagent set is formed as a combination of reagents among the plurality of reagents: wherein the at least one reagent set comprises:
a first reagent for a first analysis item; and
a second reagent for a second analysis item: wherein the first analysis item and the second analysis item are simultaneously analyzed;
an incubator having a plurality of reaction vessels arranged, the reaction vessels allowing a specimen and a reagent from the plurality of reagents to be reacted;
a sample dispensation mechanism for dispensing the specimen into the reaction vessels arranged in the incubator;
a reagent dispensation mechanism for dispensing a reagent from the plurality of reagents loaded in the reagent disc into one of the reaction vessels loaded in the incubator;
a reagent loader for loading the plurality of reagent containers from outside of the reagent disc into the reagent disc, and unloading the plurality of reagent containers to the outside of the reagent disc;
a display unit; and
a control unit configured to:
control the display unit to display a reagent set information screen that allows selection and display of the at least one reagent set collectively;
control the reagent loader to perform simultaneous unloading of the at least one reagent set that is selected on the reagent set information screen;
control the display unit to display a switch button on the reagent set information screen that switches between a first state, based on the switch button not being selected, in which information about all of a plurality of reagent sets registered to be loaded is displayed, and a second state, based on the switch button being selected, in which information about only the plurality of reagent sets registered and loaded in the reagent disc is displayed.

2. The automatic analysis device according to claim 1, wherein the display unit is configured to display on the reagent set information screen at least two of a reagent container position number of the reagent disc, an identification number for identifying the reagent held in the reagent container positioned at the reagent container position number, and a residual volume/effective date of the reagent held in the reagent container.

3. The automatic analysis device according to claim 1, wherein the display unit is configured to display on the reagent set information screen at least two of a name of the reagent, reagent identification information, a residual volume, an effective date, a calibration result, a calibration effective date, a reagent container position number, and device loading/unloading information.

4. The automatic analysis device according to claim 1, further comprising a storage unit for storing a reagent identification information file derived from accumulation of reagent identification information.

5. The automatic analysis device according to claim 1, wherein the switch button is configured to display, based on the switch button not being selected, reagents having a same reagent identification number as reagents loaded in the reagent disc.

\* \* \* \* \*